(12) United States Patent
Elsner et al.

(10) Patent No.: US 12,110,778 B2
(45) Date of Patent: Oct. 8, 2024

(54) CIVIL ENGINEERING UNDERGROUND EQUIPMENT AND METHOD FOR OPERATING CIVIL ENGINEERING UNDERGROUND EQUIPMENT

(71) Applicant: BAUER Maschinen GmbH, Schrobenhausen (DE)

(72) Inventors: Thomas Elsner, Schrobenhausen (DE); Paul Mager, Hamburg (DE); Andreas Ziegler, Gachenbach (DE)

(73) Assignee: BAUER Maschinen GmbH, Schrobenhausen (DE)

( * ) Notice: Subject to any disclaimer, the term of this patent is extended or adjusted under 35 U.S.C. 154(b) by 1187 days.

(21) Appl. No.: 16/833,911

(22) Filed: Mar. 30, 2020

(65) Prior Publication Data
US 2020/0318469 A1 Oct. 8, 2020

(30) Foreign Application Priority Data
Apr. 8, 2019 (EP) ..................... 19167742

(51) Int. Cl.
*E21B 44/00* (2006.01)
*E02D 7/00* (2006.01)
(Continued)

(52) U.S. Cl.
CPC ............. *E21B 44/00* (2013.01); *E02D 7/00* (2013.01); *E02F 5/02* (2013.01); *E02F 9/20* (2013.01);
(Continued)

(58) Field of Classification Search
CPC .......... E21B 44/00; E21B 7/022; E21B 15/00; E02D 7/00; E02F 5/02; E02F 9/20; G05B 19/04; G05B 2219/45012
See application file for complete search history.

(56) References Cited

U.S. PATENT DOCUMENTS 7,894,962 B2 * 2/2011 Sahlin ................ E02F 3/847
701/50
2009/0089703 A1 * 4/2009 Kim ..................... G01C 9/06
715/772
(Continued)

FOREIGN PATENT DOCUMENTS

CN 102108854 A 6/2011
CN 102220862 A 10/2011
(Continued)

OTHER PUBLICATIONS

An Office Action mailed by China National Intellectual Property Administration on Nov. 3, 2021, which corresponds to Chinese U.S. Appl. No. 16/833,911.4 and is related to U.S. Appl. No. 16/833,911 with English language translation.
(Continued)

Primary Examiner — Rami Khatib
(74) Attorney, Agent, or Firm — Studebaker & Brackett PC

(57) ABSTRACT

The invention relates to civil engineering underground equipment comprising at least one work element for ground work, at least two actuation units, at least one measuring device for determining at least one current actuation parameter for each actuation unit, and a controller which is designed for controlling the actuation units, wherein the controller is connected to the measuring devices and, in order to prevent a tipping of the civil engineering underground equipment, is designed to limit a further actuation of the actuation unit or to display to an operator that the limit actuation parameter has been reached and/or the limit actuation parameter, on the basis of previously calculated limit actuation parameters for the actuation units which define exactly one permissible operating range, when a limit actuation parameter of at least one actuation unit is reached. It is intended for at least two different individual operating
(Continued)

ranges to be stored in the controller, wherein each individual operating range comprises a different set of limit actuation parameters for the actuation units, and for the controller to be able to determine a combined permissible operating range.

11 Claims, 3 Drawing Sheets

(51) Int. Cl.
    *E02F 5/02*    (2006.01)
    *E02F 9/20*    (2006.01)
    *E21B 7/02*    (2006.01)
    *E21B 15/00*    (2006.01)
    *G05B 19/04*    (2006.01)

(52) U.S. Cl.
    CPC .............. *E21B 7/022* (2013.01); *E21B 15/00* (2013.01); *G05B 19/04* (2013.01); *G05B 2219/45012* (2013.01)

(56) References Cited

U.S. PATENT DOCUMENTS

2011/0254694 A1* 10/2011 Lanzl ........................ E02F 9/24
    340/689
2012/0072081 A1* 3/2012 Lanzl ...................... E21B 44/00
    701/50

FOREIGN PATENT DOCUMENTS

| | | |
|---|---|---|
| DE | 89 12 027 U1 | 11/1989 |
| DE | 4415029 A1 | 11/1995 |
| DE | 199 33 917 A1 | 2/2000 |
| DE | 10 2016 104 358 A1 | 9/2017 |
| EP | 2275604 A1 | 1/2011 |
| EP | 2 378 053 A1 | 10/2011 |
| EP | 2584097 A1 | 4/2013 |
| KR | 20020033703 A | 5/2002 |
| WO | WO-2020202309 A1 * | 10/2020 |

OTHER PUBLICATIONS

Communication of a Notice of Opposition mailed by the European Patent Office on Mar. 14, 2023, which corresponds to European U.S. Appl. No. 16/833,911—1005 and is related to U.S. Appl. No. 16/833,911; with an English translation of the Opposition dated Mar. 7, 2023.

* cited by examiner

CIVIL ENGINEERING UNDERGROUND EQUIPMENT AND METHOD FOR OPERATING CIVIL ENGINEERING UNDERGROUND EQUIPMENT

The invention relates to civil engineering underground equipment comprising at least one work element for a ground cultivation, at least two actuation units, at least one measuring device for determining at least one current actuation parameter for each actuation unit, and a controller which is designed for controlling the actuation units, wherein the controller is connected to the measuring devices and, in order to prevent a tipping of the civil engineering underground equipment, is designed to limit a further actuation of this actuation unit or to display to an operator that the limit actuation parameter has been reached and/or the limit actuation parameter, on the basis of previously calculated limit actuation parameters for the actuation units which define exactly one permissible operating range, when reaching a limit actuation parameter of at least one of the actuation units.

The invention furthermore relates to a method for operating a civil engineering underground equipment of this kind.

Civil engineering underground equipment of this kind is disclosed for example in EP 2 275 604 A1. A sensor, which can record an adjustment position of the mast, is arranged on the support device of the mast, opposite the carrier device. In this case, the sensor is connected to a control unit, by means of which an actuator of the mast is blocked when a limit position of the mast is reached. It is thus possible to reliably prevent an operating state of the civil engineering equipment in which a critical position, with respect to the stability, can result.

However, a limitation of this kind can significantly limit the possibilities provided by the adjustment mechanism. Therefore, in many equipments provision is made, for example for mounting procedures, to override electronic blocking and adjustment limitations, and to provide for adjustments of the mast, for certain situations, that extend beyond the normal limit actuation parameters. In a case of this kind, the machine operator then directly assumes the responsibility for a possible critical operating state of the machine. This can lead to industrial accidents.

The object of the invention is to specify a civil engineering underground equipment and a method for operating the civil engineering underground equipment, which ensures increased flexibility in the adjustment options, while at the same time still maintaining a high degree of operating safety.

The civil engineering underground equipment according to the invention is characterized in that at least two different individual operating ranges are stored in the controller, wherein each individual operating range has a different set of limit actuation parameters for n parameters for the actuation units, and in that one or more of the individual operating ranges can be selected by the controller.

A fundamental concept of the invention can be considered that of neither providing a single operating range for the civil engineering underground equipment, and nor to calculate new currently possible limit actuation parameters via a computer, on the basis of stored algorithms. Instead, the invention constitutes an interim solution, as it were, in which the equipment manufacturer calculates and specifies, in advance, various individual operating ranges having different sets of limit actuation parameters. It is thus possible for particular parameters to be monitored by actuation units, wherein at the same time limit actuation parameters that are adjusted to further actuation units are provided. This thus allows for an adjustment of combined permissible operating ranges, without complex calculation, in the equipment, by means of making a simple selection from specified individual operating ranges, with datasets stored therefor in each case. Combining possible individual operating ranges with different permissible limit actuation parameters, in each case, makes it possible for an increased combined permissible operating range to be determined.

Therefore, according to the invention, structural stability specifications, with discrete operating ranges in each case, and the respective limit actuation parameters thereof, can be calculated in advance.

The customer obtains a selection of structural stability specifications, in particular depending on the fitting out, comprising the corresponding individual operating ranges. These are stored in the controller, for example from an device memory, a data carrier, or by remote data transmission.

The selection of the relevant structural stability specification is made either by the operator or by the controller, on the basis of automatically determined fitting out.

Preferably at least one of the n parameters is measured constantly. The controller performs a check in which individual operating ranges the measured parameter value or measured parameter values are within the min/max interval. In each case, the lowest minimum and highest maximum values can be read out and stored in the controller for all n parameters, from these individual permissible operating ranges. It is also possible to select other limit actuation parameters (min/max values) within these limits.

At least 1 to n of said limit actuation parameters are displayed to the operator, in each case, and/or at least 1 to n of said limit actuation parameters are used, in each case, by the controller as "stop" for the actuation of adjustment means, e.g. as a disconnection function for the mast radius, or as a limitation function for the rotational speed.

If one or more of said parameters change, e.g. if the load is raised and/or the mast or boom is extended, the limit actuation parameters are adjusted, by the ongoing monitoring, to the measured values that change as a result. The respective permissible individual operating ranges can change permanently, as a result, depending on the situation, more and higher limit actuation parameters are available than is the case when specifying the permissible operating range by means of exactly one individual operating range.

In the prior art, in each case just one individual operating range is provided, from a set of individual operating ranges, which range proceeds from some fixed parameters and therefore, for many situations, specifies limit actuation parameters that are too narrow. In individual cases it is possible to exceed said limit actuation parameters, using corresponding actuation means, wherein, however, the operating range statically checked by the equipment manufacture is left.

As an alternative thereto, the prior art provides the operator with the limit actuation parameters of the individual operating ranges in written form. The operator must therefore constantly check which of the individual operating ranges he is currently in, and what limit actuation parameters are to be adhered to. This is associated with the risk of errors which, in the worst case, can lead to a overturning of the civil engineering underground equipment, and the corresponding consequences.

A preferred embodiment of the invention consists in it being possible to select a structural stability specification, comprising a plurality of individual operating ranges, depending on the equipment, in particular a work element, the mode of operation and/or further criteria. It is thus possible, for example in the case of a drill, for a suitable structural stability specification to be selected, depending on the drilling tool selected, for example a drilling bucket or an endless screw, which specification contains a plurality of individual operating ranges. In the mode of operation, too, it is possible to distinguish for example between drilling mode and change-over mode, wherein in a change-over mode, lower operating forces make it possible for a different structural stability specification to be provided, having operating ranges that generally have wider or larger limit actuation parameters, for example for adjustment ranges.

At the same time, for example in a change-over mode, actuation units would then be limited for an advancement, for example, or blocked entirely, or a lower permissible winch lifting force is displayed. With respect to further criteria, it is possible, for example, for a selection of the structural stabilities to be selected depending on the ground conditions. If the ground is solid and stable, a different structural stability specification having different individual operating ranges can be selected, than in the case of softer ground.

In principle, the structural stability specifications with the relevant individual operating ranges thereof, which are stored in the civil engineering underground equipment, can be changed. In this case, according to an embodiment of the invention, it is advantageous for the structural stability specifications in the controller to be transferred into a database of the controller, depending on fitting out of the civil engineering underground equipment, in particular a work element. If, for example, a special drilling tool is selected as the work element and attached to the civil engineering underground equipment, then only the individual operating ranges that are calculated for said work element are stored in the database of the controller or at least retrievable. The transfer into the data memory of the controller can take place by means of using a corresponding data carrier or by remote data transfer.

In principle all the different actuation units that can be provided on civil engineering underground equipment can be taken into account in the assembly according to the invention. The actuation units preferably each comprise at least one actuating drive.

According to a development of the invention, it is preferable for feed forces on the work element, winding forces, hydraulic operating pressures, operating positions of components of the civil engineering underground equipment, in particular of the mast, a chassis, a superstructure, states of additional supports, rotational speeds, in particular of the superstructure and/or rotational accelerations, in particular of the superstructure, to be provided as operating parameters.

According to a variant of the invention, it may furthermore be possible for a wind pressure and/or an inclination of the civil engineering underground equipment, or the mass of a counterweight, to be able to be determined by means of sensor elements of the measuring device, or to be able to be input by the operator or an identification.

It is furthermore preferable for a support device, a mast that is mounted on the support device so as to be displaceable at least in a horizontal direction, wherein at least one mast adjustment drive is provided for the adjustment, and a measuring device for detecting an adjustment position of the mast, at least in the horizontal direction, to be provided, wherein the controller is designed to set a specified limit parameter for the at least one further actuation unit, in the event of an increase in the distance of the mast above a first limit distance, by means of which an operation of the actuation drive or the further actuation unit is limited.

In this case it is provided that the controller permanently checks in which individual operating ranges the relevant actuation units are, determines therefrom the permissible individual operating ranges in which the values of all recorded actuation units are within the limit actuation parameters, and, proceeding from the limit actuation parameters of said permissible individual operating ranges, sets the maximum limit actuation parameter as the limit actuation parameter for the further actuation unit. If for example a horizontal distance between the mast and the support device increases beyond a first limit actuation parameter, at least one individual operating range becomes thus not permissible, therefore another lower limit actuation parameter is set for at least one other operating parameter of at least one further actuation unit, i.e. for example a limitation of the rotational speed of the superstructure, or of tensile forces on the mast. In this case, this state for the enlarged limit distance of the mast is first of all calculated and checked for the static stability thereof.

In principle, exceeding the limit actuation parameter and the omission of the at least one individual permissible operating range can result in an adjustment of various operating parameters. According to a development of the invention, it is particularly preferable for the at least one actuation unit to comprise a cable winch for moving a work element along the mast, an auxiliary winch for an auxiliary cable, an actuator for tilting the mast relative to a vertical, and/or a rotation means for rotating the superstructure, together with the mast, relative to an undercarriage. The work element that is movable along the mast can in particular be a carriage, preferably a drill drive carriage, to which a civil engineering underground tool is attached. The auxiliary cable of the auxiliary winch is preferably guided by deflection pulleys on the mast head, and can be used for additional lifting applications, for example for raising drill pipe elements or civil engineering underground tools. With respect to the rotation means, the limit actuation parameter can relate to an angle of rotation or a rotational speed. The specification of a limit actuation parameter can also be a zero value, so that a corresponding drive, for example for the auxiliary cable, is blocked.

A further increase in the permissible combined operating range can be achieved in that at least one third limit distance is specified in the controller, which distance is associated with at least one further limit actuation parameter that is associated with at least one further actuation unit, i.e. that defines a third individual operating range. In principle, a selection of program settings can be provided in a control unit, for example for normal construction or drilling mode, a change-over mode, a travel mode, and further operating states to which the relevant structural stability specifications particular limit distances, in each case, of the mast relative to the support device, and further limit parameters of at least one actuation unit, are stored, in the individual operating ranges.

In this case, according to a variant of the invention it is particularly preferable for the controller to comprise a data memory in which the limit distances with the limit parameters associated in each case, are stored as datasets, in the form of individual operating ranges. Said datasets are based on previously performed static calculations for a stability against overturning of the equipment which cannot be changed either by the operator or by the control unit itself. The datasets can be firmly specified in an internal or external memory or can be transmitted or called up from a center by means of remote data transmission.

The civil engineering equipment is preferably designed as a drill, a trench cutter, a gripper, in particular a trench wall grab, a ram or a vibrator. The drill in particular comprises a drilling tool which is rotatably driven by a drill drive. The trench cutter in principle comprises two pairs of cutter wheels which are arranged on a lower end of a cutting frame.

The method according to the invention is characterized in that the highest limit actuation parameters in each case are selected by the controller, in a comprehensive manner, from the permissible individual operating ranges, and thus form a permissible combined operating range, wherein each individual operating range comprises a different set of limit operating parameters for the actuation units.

The advantages described above can be achieved by means of the method. The method can in particular be performed by the civil engineering underground equipment described above.

The invention will be described in further detail in the following, with reference to preferred exemplary embodiments that are shown schematically in the drawings. In said drawings.

Figure 1:
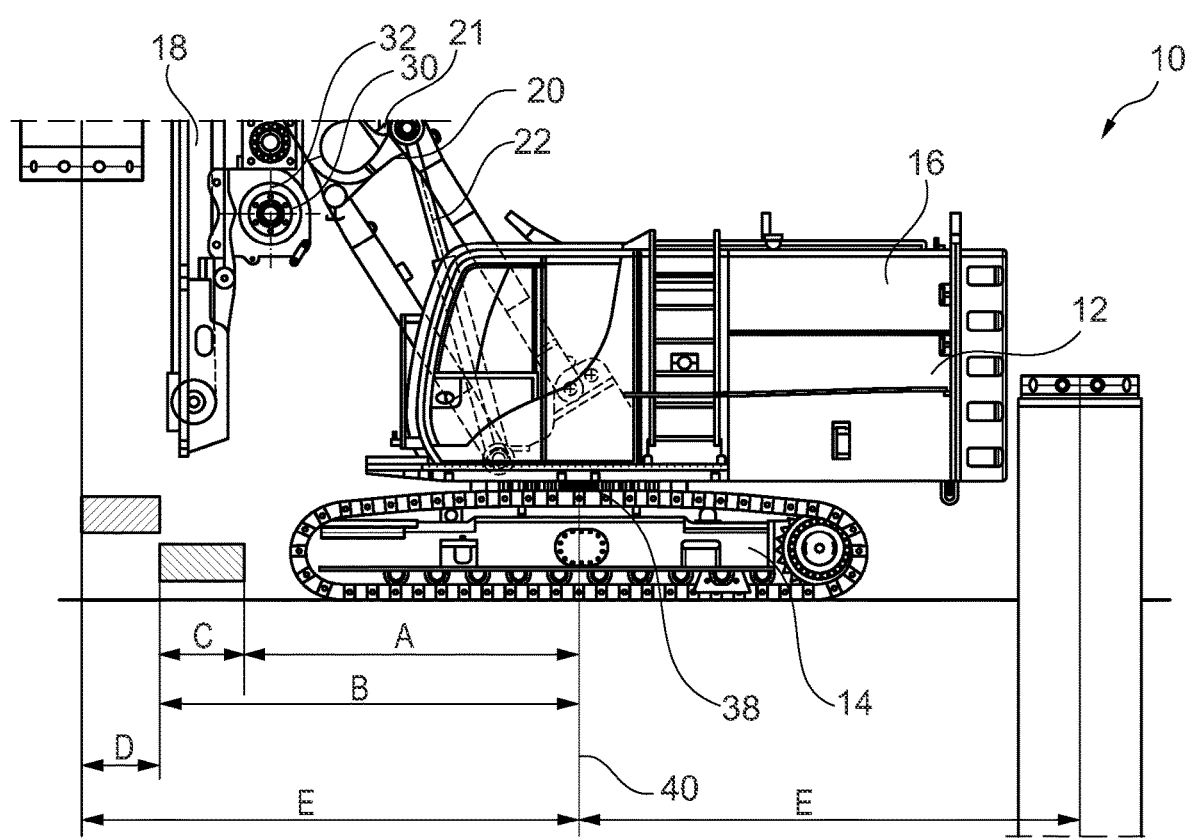
FIG. 1 is a partial sectional view of civil engineering underground equipment according to the invention.

According to FIG. 1, a civil engineering underground equipment 10 according to the invention comprises a support device 12 on which an adjustment mechanism 21 is provided as a first actuation unit 20. Thereover, an approximately vertically oriented mast 18 is mounted so as to be adjustable in the vertical and in particular in the horizontal direction. The support device 12 comprises an undercarriage 14 that is formed as crawler track and on which a superstructure 16 comprising an operator cab is rotatably mounted. The superstructure 16 can be rotated relative to the undercarriage 14 about a vertical directed axis of rotation 40, by a rotation means 38 (not shown in greater detail). A mast adjustment drive 22 is provided for adjusting the mast 18 relative to the superstructure 16. The mast 18 is displaceable relative to the support device 12, in the horizontal direction, with respect to the axis of rotation 40. In this case, in normal operation the horizontal adjustment range of the mast 18 is adjustable between a minimum distance A, relative to the axis of rotation 40, and a maximum distance B. This results in a horizontal adjustment range C for an normal operation. Said normal operating range B of the mast 18 in the horizontal direction allows for a safe operation of the civil engineering equipment 10 irrespective of what permitted working tools, working forces and operating parameters are specified or set. The normal operation can in particular be a working operation, in which for example a hole, in particular a bore, is made in the ground.

For specific cases it may, however, be desirable to increase the safe maximum operating range B by an enlarged distance D for each operating state, in order to thus achieve an enlarged limit distance E relative to the axis of rotation 40. This has been achieved hitherto in that the civil engineering underground equipment 10 was moved in the direction of the enlarged distance D, which, however, brings with it further problems. It is thus necessary, for example, that, following the reception of a drill pipe 5 stored in a reception region, at an enlarged distance from the axis of rotation 40, the civil engineering underground equipment 10 be moved to the original position again, which has to be carried out very precisely in order that the original drilling point is found again. Therefore it was possible, in these cases, that a machine operator instead autonomously left the statically safe operating range of the equipment and enlarged the mast distance, switching off safety devices.

Figure 2:
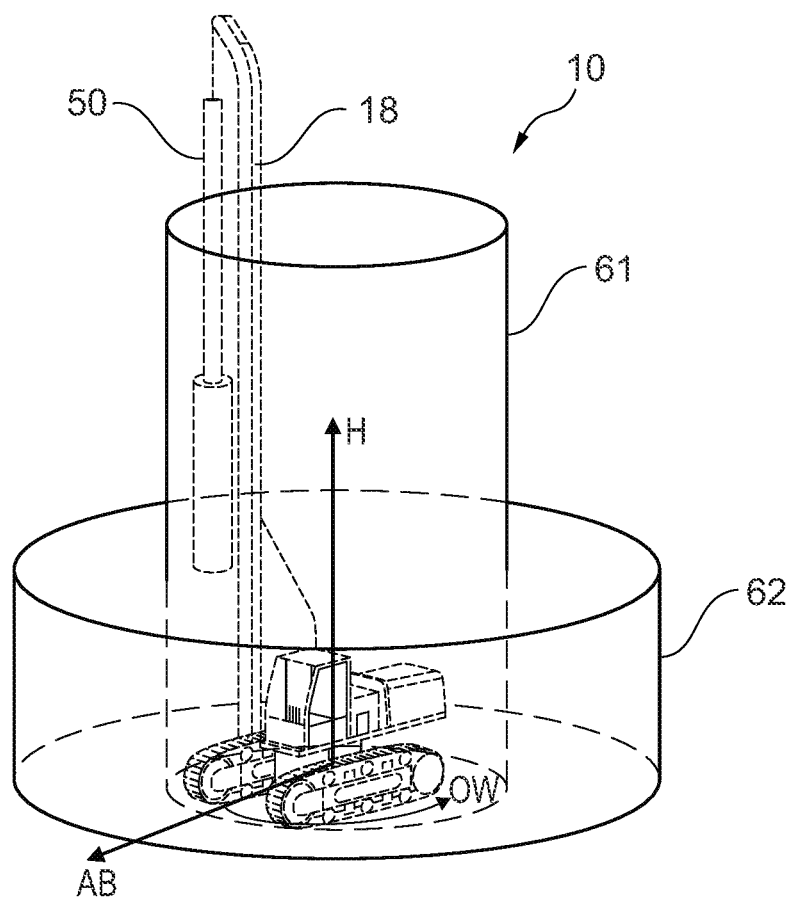
FIG. 2 is a perspective view of civil engineering underground equipment according to the invention with schematic view of operating ranges.

As is evidently shown in FIG. 2, the civil engineering underground equipment 10 according to the invention comprises a controller in which, in the event of a movement of the mast 18 in the horizontal direction, relative to the support device 12, beyond the limit actuation parameter defined in the individual operating range 61, at least one operating parameter of a second actuation unit 30, which in particular actuates a cable winch 32 for adjusting a rotary drive 52 along the mast 18, or a rotation means 38 for the superstructure 16, is restricted to a firmly set limit operating parameter.

In this case, according to the invention, in the case of the newly approached distance of the mast 18 and the limited operating parameters of the actuation unit 30, a static security against a tilting of the civil engineering underground equipment 10 is calculated, so that the controller can select the possibly higher limit actuation parameters from the operating range 62, e.g. for the rotational speed of the superstructure 16, for the other operating parameters of the civil engineering underground equipment 10.

This results in an enlarged operating range, specifically a permissible combined operating range. In the embodiment shown according to FIG. 2, the cylindrical operating ranges 61, 62 shown are defined by a maximum possible distance of the mast 18 relative to the axis of rotation 40, in the horizontal direction, and a maximum possible lifting height of the work element 50 on the mast 18. It should in particular be understood that an enlargement of the operating range AB in the horizontal direction, at continuing stability against overturning, can be achieved by a specified reduction in a vertical lifting height H of the work element 50. In other words, an operator can extend the mast 18 further out, provided that a maximum lifting height H of the work element 50, stored in the working range 62, is not exceeded. If the mast 18 has already been extended so far that the equipment is exclusively within the limits of the structural stability specification 62, a raising of the work element 50 beyond the limit actuation parameters stored in the structural stability specification 62 is prevented by the controller. Furthermore, a higher specified rotational speed OW of the superstructure is provided, which speed is limited only upon leaving the region of the operating range 62.

Hitherto, it was not possible for the operator to leave the individual operating range 61, even if for example the lifting height of the work element 50 was in the region of the individual operating range 62. The operator now has available a combined permissible operating range, formed of the sum of the two operating ranges 61, 62, without manually changing specifications, a special selection, or knowingly exceeding limit actuation parameters.

Figure 3:
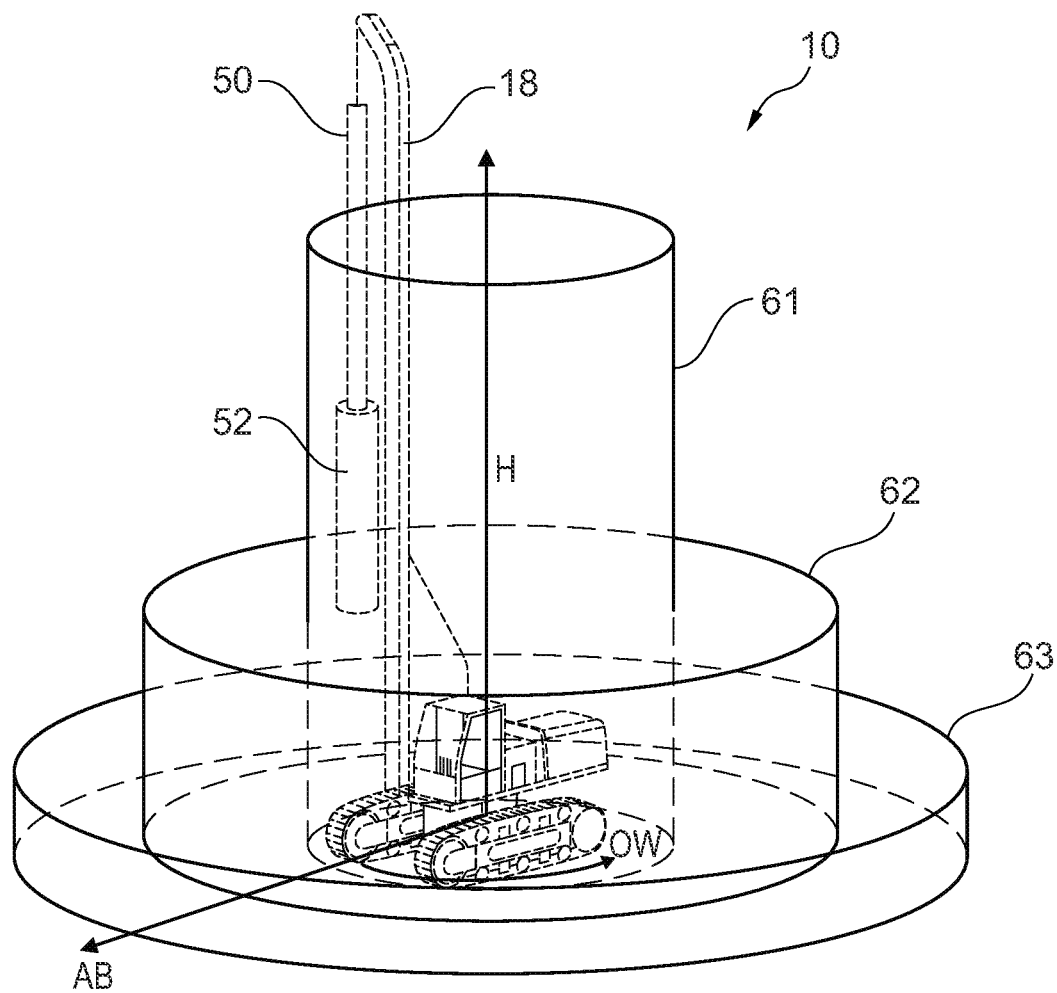
FIG. 3 is a perspective view of a further embodiment of civil engineering underground equipment according to the invention with schematic view of the operating ranges.

In a further embodiment of civil engineering underground equipment 10 according to the invention, according to FIG. 3, an enlargement of the distance, i.e. the operating range AB, of the mast 18 in the horizontal direction relative to the support device 12, with respect to the axis of rotation 40, is shown in two steps. On the basis of the individual operating ranges 61, 62 according to FIG. 2, a further enlargement of the operating range in the horizontal direction can be achieved in the case of a second further limit distance, provided that for the lifting height H of the working element 50 a further, lower limit actuation parameter, as is shown by a cylindrical third operating range 63, is not exceeded.

For the purpose of simplified representation, the exemplary embodiments are described having only a few actuation parameters. According to the invention, further or other actuation parameters of other actuation units can be provided and taken into account.

The invention claimed is:

1. A civil engineering underground equipment comprising:
   at least one work element for groundwork,
   at least two actuation units,
   at least one measuring device including sensor elements for determining at least one current actuation parameter for each actuation unit, and
   a controller, including a database, which is designed for controlling the actuation units,
   wherein the controller is connected to the measuring devices, in order to prevent a tipping of the civil engineering underground equipment, and is designed to limit a further actuation of this actuation unit or to display to an operator that the limit actuation parameter has been reached and/or the limit actuation parameter, on the basis of previously calculated limit actuation parameters for the actuation units which define exactly one permissible operating range, when a limit actuation parameter has been reached,
   wherein
   at least two different individual operating ranges are stored in the controller, wherein each individual operating range comprises a different set of limit actuation parameters for the actuation units,
   the controller is designed to determine a combined permissible operating range, by combining the plurality of permissible independent operating ranges, which combined range replaces the exactly one permissible operating range, and
   the controller is designed to determine a current value of at least one actuation parameter, during operation of the civil engineering equipment, and, in the event of an associated limit actuation parameter of at least one of the permissible individual operating ranges being exceeded, to no longer take account of said individual operating range with the maximum limit actuation parameters thereof, when determining the combined permissible operating range, and to restrict the combined permissible operating range.

2. The civil engineering underground equipment according to claim 1, wherein
   a structural stability specification containing at least two individual operating ranges can be selected depending on the fitting out of the civil engineering equipment, a mode of operation, and/or further criteria.

3. The civil engineering underground equipment according to claim 1, wherein
   the individual operating ranges of the structural stability specification in the controller are transferred into the database of the controller, depending on a fitting out of the civil engineering underground equipment.

4. The civil engineering underground equipment according to claim 1, wherein
   feed forces on the work element, winding forces, hydraulic operating pressures, operating positions of components of the civil engineering underground equipment, states of additional supports, rotational speeds, and/or rotational accelerations, are included as actuation parameters.

5. The civil engineering underground equipment according to claim 1, wherein
   as further passive actuation parameters, a wind pressure and/or an inclination of the civil engineering underground equipment, and/or the mass of a counterweight, can be determined by means of the sensor elements of the measuring device, or can be input by an operator.

6. The civil engineering underground equipment according to claim 1, wherein
   a support device,
   a mast that is mounted on the support device so as to be adjustable at least in a horizontal direction, wherein at least one mast adjustment drive is provided for adjustment, and
   a measuring device for detecting an adjustment position of the mast, at least in the horizontal direction, are provided,
   wherein the controller is designed to set a specified limit actuation parameter for the at least one further actuation unit, by means of which an operation of the actuation drive of the further actuation unit is limited, when the distance of the mast increases beyond a limit distance.

7. The civil engineering underground equipment according to claim 6, wherein
   the at least one actuation unit comprises a cable winch for moving a work element along the mast, an auxiliary winch for an auxiliary cable on the mast, an actuator for tilting the mast relative to a vertical, a rotation means for rotating the mast about an axis in parallel with the longitudinal extension thereof, and/or a rotation means for rotating a superstructure together with the mast, relative to an undercarriage.

8. The civil engineering underground equipment according to claim 1, wherein
   the controller comprises a data memory in which individual operating ranges with the limit actuation parameters associated in each case are stored as dataset.

9. The civil engineering underground equipment according to claim 1, wherein
   said equipment is designed as a drill, a trench wall cutter, a gripper, a ram, or a vibrator.

10. A method for operating the civil engineering underground equipment according to claim 1, wherein
    the controller combines the at least two different individual operating ranges, and determines a combined permissible operating range from the plurality of operating ranges.

11. A civil engineering underground equipment comprising:
    at least one work element for groundwork,
    at least two actuation units,
    at least one measuring device including sensor elements for determining at least one current actuation parameter for each actuation unit, and
    a controller, including a database, which is designed for controlling the actuation units,
    wherein the controller is connected to the measuring devices, in order to prevent a tipping of the civil engineering underground equipment, and is designed to limit a further actuation of this actuation unit or to display to an operator that the limit actuation parameter has been reached and/or the limit actuation parameter, on the basis of previously calculated limit actuation parameters for the actuation units which define exactly one permissible operating range, when a limit actuation parameter has been reached,
wherein
at least two different individual operating ranges are stored in the controller, wherein each individual operating range comprises a different set of limit actuation parameters for the actuation units,
the controller is designed to determine a combined permissible operating range, by combining the plurality of permissible independent operating ranges, which combined range replaces the exactly one permissible operating range, and
the controller is designed to determine a current value of at least one actuation parameter during operation of the civil engineering underground equipment, and, in the event of falling below an associated limit actuation parameter of at least one of the individual operating ranges not yet taken into account, to take into account said individual operating range with the maximum limit actuation parameters thereof, when determining the combined permissible operating range, and to enlarge the combined permissible operating range.

* * * * *